United States Patent Office 3,502,609
Patented Mar. 24, 1970

3,502,609
EPOXY RESIN-BIPHENYL ANHYDRIDE ADHESIVE COMPOSITIONS
Walter P. Barie, Jr., Glenshaw, and Norman W. Franke, Penn Hills Township, Allegheny County, Pa., assignors to Gulf Research & Development Company, Pittsburgh, Pa., a corporation of Delaware
No Drawing. Continuation-in-part of application Ser. No. 334,716, Dec. 31, 1963. This application June 2, 1967, Ser. No. 643,075
Int. Cl. C08g 51/04; C08k 1/02
U.S. Cl. 260—37
15 Claims

ABSTRACT OF THE DISCLOSURE

A new epoxy resin adhesive composition having high initial tensile lap shear strength which is retained on heat aging is claimed as is the method of preparation. The composition contains an epoxy resin, certain solid biphenyl anhydrides having at least one anhydride function on each phenyl group, and a powdered metal. The composition is prepared by suspending the solid biphenyl anhydride in the epoxy resin by a high shear mixing force.

---

This invention relates to new and useful epoxy resin adhesive compositions which on curing have excellent retention of tensile lap shear strength values after heat aging.

This application is a continuation-in-part of our prior co-pending application, Ser. No. 334,716, filed Dec. 31, 1963, now U.S. Patent 3,324,081.

Epoxy resins are well known in the art and comprise a molecule which contains on the average more than one epoxy group. The resins are converted into hard, infusible cross-linked polymers by curing. Curing of the resins may be effected by a catalytic type polymerization process or by a coupling type process. The compositions of the subject invention are formed by the coupling type process wherein the epoxy resin is reacted with polyfunctional cross-linking agents to be defined to couple or cross-link one epoxy resin molecule with another.

The properties of the epoxy resins and the cured reaction products will depend, of course, on the nature of the epoxy resins and the cross-linking agents. It is desirable for some adhesive applications that the adhesive have a high initial tensile lap shear strength and retain high tensile lap shear strength even after being subjected to elevated temperatures for extended periods of time. For example, in the adhesion of metal parts for use in high temperature work, it is frequently important that the adhesive bonds not fail over extended periods of time. It is also desirable to be able to apply these adhesive compositions at room temperature so that no elaborate and expensive application techniques are required.

It has been found that all of the above desirable results are achieved by the epoxy resin adhesive compositions of this invention.

In accordance with the invention a new adhesive composition suitable for application at room temperature and which on curing results in a resin having excellent tensile lap shear strength retention properties after heat aging comprises:

A suspension of—

A solid biphenyl anhydride selected from the group consisting of:

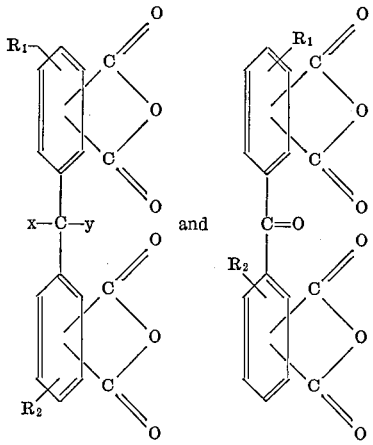

where $x$ and $y$ are monovalent radicals selected from the group consisting of H; an alkyl group having between 1 and 5 carbon atoms; a halogen; OH; OR, where R is an alkyl group having between 1 and 5 carbon atoms; and

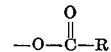

where R is as defined; and where $R_1$ and $R_2$ are monovalent radicals selected from the group consisting of H; an alkyl group having between 1 and 5 carbon atoms; and a halogen; and a finely divided solid filler comprising a powdered metal in a liquid 1,2-epoxy resin which contains on the average more than one 1,2-epoxy group per molecule; the amount of said powdered metal being at least 20 parts per 100 parts of resin and the amount of said solid biphenyl anhydride being such that the anhydride to epoxide equivalent ratio is between 0.4 and 1.0.

Any of the liquid epoxy resins well known in the art can be employed in the new compositions of this invention. By an epoxy resin is meant any molecule which contains on the average more than one epoxy group. An epoxy group is a three-membered ring containing one oxygen and two carbon atoms. The liquid aromatic type epoxy resins are preferred. The more preferred epoxy resins are generally prepared by the reaction of an epihalohydrin with (1) a polyhydric alcohol, (2) a phenol or (3) a phenol-formaldehyde product. The reaction products are complex mixtures of polyethers having terminal 1,2-epoxide groups and in which alternating intermediate aliphatic hydroxy-containing radicals are linked through ether oxygens to aliphatic or aromatic nuclei. Other suitable epoxy resins include, for example, butane dioxide and limonene dioxide.

The high molecular weight complex polyether compositions are thermoplastic, but are capable of forming thermosetting compositions by further reaction through the hydroxy and/or 1,2-epoxide groups with a cross-linking agent. In order to form these thermosetting compositions, the epoxy resin must have a 1,2-epoxide equivalency greater than one. By epoxide equivalency is meant the average number of 1,2-epoxide groups contained in the measured molecular weight of the resin. Since the epoxy resin is a mixture of polyethers, the measured molecular weight, upon which the 1,2-epoxide equivalency depends, is necessarily an average molecular weight. Hence, the 1,2- epoxide equivalency of the resin will be a number greater than one, but not necessarily an integer. If the measured molecular weight and epoxide value are given, the 1,2-epoxide equivalency can easily be determined. For example, an epoxy resin having an average molecular weight of 900 and an epoxide value of 0.2 has a 1,2-epoxide equivalency of 1.8.

The epoxide value of an epoxy resin is the number of epoxide groups per 100 grams of resin. This value can be determined experimentally by heating a one gram sample of the epoxy resin with an excess of a pyridine solution of pyridine hydrochloride (obtained by adding sixteen cc. of concentrated hydrochloric acid to a liter of pyridine) at the boiling point for twenty minutes and then back titrating the unreacted pyridine hydrochloride with 0.1 N NaOH to the phenolphthalein end point. In the calculations, each HCl consumed by the resin is considered to be equivalent to one epoxide group.

The preferred epoxy resins are prepared by the reaction of epichlorohydrin with a dihydric phenol and have the general formula:

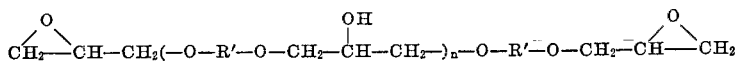

where R′ is a divalent aromatic radical and $n$ is an integer between 0 and about 18. As the ratio of the epichlorohydrin to dihydric phenol increases, the value of $n$ decreases.

Bisphenol A [bis(4-hydroxy phenyl)dimethyl methane] is perhaps the dihydric phenol most frequently employed. Thus, R′ in the above formula would be:

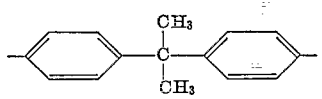

When $n$ in the above formula is zero, a diglycidyl ether having the following formula results:

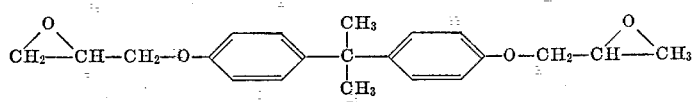

The above ether can be obtained when the mol ratio of epichlorohydrin to bisphenol A is about 10:1. Lower ratios will produce higher molecular weight polyethers. For the preferred resins which have a molecular weight between about 350 and 600, the mol ratio of epichlorohydrin to bisphenol A can be between about 1:1 and 10:1. Referring to the general formula above, for the preferred resins, $n$ will vary between 0 and 1. The epoxide equivalent (which is defined as the weight of resin in grams containing 1 gram equivalent of epoxy) should be between about 175 and 300, which is one-half the average molecular weight. The viscosity of the polyether will vary from 3,000 to 30,000 cps. at 25° C. Many commercially available epoxy resins with suitable properties may be employed. For example, suitable resins include "Bakelite ERL-2774"; "Bakelite ERL-3794"; "Epi-Rez 510"; "Epon 820" and "Epon 828." "Bakelite" is the trademark of Union Carbide Corporation; "Epi-Rez" is the trademark of Jones-Dabney Co., Division of Devoe and Reynolds Co.; and "Epon" is the trademark of the Shell Chemical Co.

The epoxy resins used in the compositions of this invention are hardened or cured by the use of at least one anhydride cross-linking agent. The one anhydride is a biphenyl anhydride having at least one anhydride function on each phenyl group and wherein the phenyl groups are linked through a single carbon atom.

The preferred biphenyl dianhydrides are selected from the group consisting of:

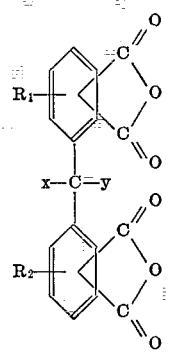

and

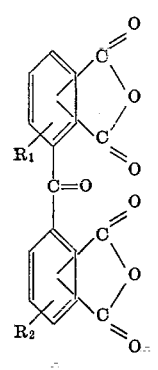

where $x$ and $y$ are monovalent radicals selected from the group consisting of H; an alkyl group having between 1 and 5 carbon atoms; a halogen; OH; OR, where R is an alkyl group having between 1 and 5 carbon atoms; and

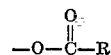

where R is an alkyl group having between 1 and 5 carbon atoms; and where $R_1$ and $R_2$ are monovalent radicals selected from the group consisting of H; an alkyl group having between 1 and 5 carbon atoms; and a halogen.

Suitable examples of biphenyl anhydrides which can be utilized in the compositions of this invention are given below:

3,4,3′,4′-diphenylmethane tetracarboxylic dianhydride;
2,3,2′,3′-diphenylmethane tetracarboxylic dianhydride;
2,3,3′,4′-diphenylmethane tetracarboxylic dianhydride;
2-methyl-3,4,3′,4′-diphenylmethane tetracarboxylic dianhydride;
2,2′-dimethyl-3,4,3′,4′-diphenylmethane tetracarboxylic dianhydride;
2-ethyl-2′-propyl-3,4,3′,4′-diphenylmethane tetracarboxylic dianhydride;
2-amyl-3,4,3′,4′-diphenylmethane tetracarboxylic dianhydride;

2-butyl-2'-propyl-3,4,3',4'-diphenylmethane tetracarboxylic dianhydride;
chloro-3,4,3',4'-diphenylmethane tetracarboxylic dianhydride;
dichloro-3,4,3',4'-diphenylmethane tetracarboxylic dianhydride;
bromo-3,4,3',4'-diphenylmethane tetracarboxylic dianhydride;
dibromo-3,4,3',4'-diphenylmethane tetracarboxylic dianhydride;
3,4,3',4'-benzhydrol tetracarboxylic dianhydride;
2,3,2',3'-benzhydrol tetracarboxylic dianhydride;
2,3,3',4'-benzhydrol tetracarboxylic dianhydride;
2-methyl-3,4,3',4'-benzhydrol tetracarboxylic dianhydride;
2,2'-dimethyl-3,4,3',4'-benzhydrol tetracarboxylic dianhydride;
2-butyl-2'-propyl-3,4,3',4'-benzhydrol tetracarboxylic dianhydride;
3,4,3',4'-benzhydrol tetracarboxylic dianhydride methyl ether;
3,4,3',4'-benzhydrol tetracarboxylic dianhydride ethyl ether;
2,3,3',4'-benzhydrol tetracarboxylic dianhydride propyl ether;
2,3,2',3'-benzhydrol tetracarboxylic dianhydride butyl ether;
3,4,3',4'-benzhydrol tetracarboxylic dianhydride acetate;
3,4,3',4'-benzhydrol tetracarboxylic dianhydride propionate;
2,3,3',4'-benzhydrol tetracarboxylic dianhydride butyrate;
3,4,3',4'-benzophenone tetracarboxylic dianhydride;
2,3,2',3'-benzophenone tetracarboxylic dianhydride;
2,3,3',4'-benzophenone tetracarboxylic dianhydride;
2-methyl-3,4,3',4'-benzophenone tetracarboxylic dianhydride;
2,2'-dimethyl-3,4,3',4'-benzophenone tetracarboxylic dianhydride;
2-ethyl-2'-methyl-3,4,3',4'-benzophenone tetracarboxylic dianhydride;
2-butyl-2'-ethyl-3,4,3',4'-benzophenone tetracarboxylic dianhydride;
2-amyl-3,4,3',4'-benzophenone tetracarboxylic dianhydride;
2-butyl-2'-propyl-3,4,3',4'-benzophenone tetracarboxylic dianhydride
2-chloro-2'-methyl-3,4,3',4'-benzophenone tetracarboxylic dianhydride;
2,2'-dichloro-3,4,3',4'-benzophenone tetracarboxylic dianhydride;
2-chloro-3,4,3',4'-benzophenone tetracarboxylic dianhydride;
2-bromo-3,4,3',4'-benzophenone tetracarboxylic dianhydride;
2-iodo-3,4,3',4'-benzophenone tetracarboxylic dianhydride;
2-fluoro-3,4,3',4'-benzophenone tetracarboxylic dianhydride; and
2,5'-dichloro-2',3',3,4-benzophenone tetracarboxylic dianhydride.

It has also been found that the activity of the biphenyl anhydride is a function of the free acid content of the anhydride. It is preferred that the phenyl anhydride be substantially free of carboxylic acid groups, and in any case, the percent free acids in the biphenyl anhydride should be less than 6 weight percent, and preferably less than about 2 weight percent.

The ratio of the chemical anhydride equivalents of the biphenyl anhydrides to the chemical epoxide equivalents of the epoxy resin (an A/E ratio) is suitably maintained between 0.4 and 1.0 with a preferred ratio between 0.55 and 0.9 and a most preferred ratio between 0.58 and 0.63.

It has been found that the addition of fillers comprising a powdered metal and, in particular, the addition of a combination of a metallic and non-metallic oxide filler results in adhesive formulations having unexpectedly high initial tensile lap shear strengths which strengths are retained over extended periods of heat aging. Suitable metallic fillers include finely divided (powdered) metals, exemplified but not limited to aluminum and iron.

Non-metallic fillers alone appear to decrease the tensile lap shear strength of the adhesives of this invention. On the other hand, the addition of a non-metallic oxide, such as silicon dioxide, along with the powdered metal has an unexpected effect on increasing the tensile lap shear strength of the adhesive. The non-metallic oxide should be finely divided, of course. In addition to the silicon dioxide mentioned above, suitable non-metallic oxide materials include alumina, calcium carbonate, magnesium silicate, alumina silicate, kaolin, hydrated alumina and thixotropic agents, such as bentonite clays.

The fillers both metallic and non-metallic oxide can range in particle size between 200 mesh to about 0.015 micron. The amount of filler to be employed depends to some extent upon the thickening properties of the particular filler chosen. The metallic fillers, such as powdered aluminum, tend to have less thickening effect on the epoxy resin than the non-metallic materials, such as the alumina silicates. The amount of metallic filler should be at least 20 parts per hundred parts of resin (phr.) and can suitably be as high as 200 parts per hundred parts of resin (phr.) with the preferred amount of metallic filler being between 80 and 120 phr. Much lower amounts of the non-metallic oxide thickener type fillers are employed, amounts between 1 and 50 parts being generally satisfactory and preferred amounts being between 1 and 20 phr.

As noted, the best adhesive formulations are those which use a combination of a powdered metallic filler, such as aluminum, and a finely divided non-metallic oxide filler, such as silicon dioxide. Particularly preferred combinations are those using between 80 and 120 phr. of powdered metals and between 1 and 10 phr. of the non-metallic oxide fillers.

It has been found that the biphenyl anhydride cross-linking agents defined above are substantially insoluble in the liquid epoxy resins at room temperature. The solubility of the biphenyl anhydrides in the liquid epoxy resins increases upon heating the liquid epoxy resin, but due to the high functionality and therefore the high activity of the biphenyl anhydrides, the heating of the epoxy resin before or during the addition of the biphenyl cross-linking agent results in rapid gelation and solidification of the epoxy resin composition. What is desired is to incorporate the biphenyl anhydride cross-linking agent into the epoxy resin at a low temperature, such as room temperature, so that the adhesive composition can be applied at room temperature and yet possess and retain high tensile lap shear strength values upon curing at an elevated temperature. Suggestions have been made to employ a common solvent to prepare solutions of reactive cross-linking agents in epoxy resins; however, the biphenyl anhydride cross-linking agents defined above are substantially insoluble in most materials. A method has now been found for preparing the epoxy resin adhesive compositions defined above at a low temperature between about 20° and about 40° C. and preferably at room temperature wherein the composition is stable, can be applied at room temperature and cured at elevated temperatures to give adhesive bonds which have high initial tensile lap shear strengths and which high shear strengths are retained over long periods of time under elevated temperatures. This method consists of suspending the finely divided solid biphenyl anhydride in the liquid epoxy resin. The suspension is formed by subjecting a mixture of the powdered solid biphenyl anhydride and the liquid epoxy resin to a high shear mixing action for a time sufficient to maintain the solid biphenyl anhydride in suspension at room temperature for a period of at least seven days. Any suitable means can be employed to achieve the desired suspension. One suitable means involves passing the admixture of the finely divided solid biphenyl anhydride and the liquid epoxy resin through a three-roll mill. Other suitable means would include the use of ball mills or chain mills. Simple mechanical stirring has been found to be insufficient to achieve the desired results, especially with the lower viscosity liquid epoxy resins.

After the incorporation of the solid biphenyl anhydride into the liquid epoxy resin to form a suspension, the desired fillers in the above described amounts can then be added with simple mechanical stirring if the powdered metals are sufficiently finely divided.

Properties of the hardened epoxy resins are affected by the curing conditions wherein more complete crosslinking occurs. Curing can occur at temperatures between about 150° and 280° C. for time periods as short as five minutes to times as long as two days or more. In general, the higher the curing temperature, the shorter the time required to produce a completely cured epoxy resin product. The preferred curing temperatures are between 150° and 240° C. at cure times between 0.5 and 48 hours with more preferred cure times between 1 and 5 hours.

The adhesive compositions of this invention are applied to a suitable substrate at room temperature or thereabouts before curing. Since elevated temperatures are required for curing, the substrate should be such that it is not damaged by the high curing temperatures required. Normally, the adhesives of this invention are employed for the attachment of one metallic part to another, although ceramic or other heat resistant materials can also suitably be joined together with the adhesive compositions of this invention. It has been found that the prior treatment of the substrate is important so far as the strength of the tensile lap shear bond obtainable is concerned. For example, the metallic surface can be sandblasted or acid-etched, with acid-etching being the preferred procedure for preparing a metal surface for bonding using the adhesive compositions of this invention.

In addition, various well-known cure accelerators, such as tertiary amines, can be added to the compositions, if desired. Suitable accelerators include benzyl-dimethylamine; alpha-methylbenzyldimethylamine; dimethylaminopropylamine; dimethylaminomethyl phenol (DMP–10 by Rohm and Haas); and tris (dimethylaminomethyl) phenol (DMP–30). Strongly acidic materials, such as boron trifluoride, can also be used.

The invention will be further described with reference to the following experimental work.

Unless otherwise indicated, the epoxy resin employed in the series of epoxy resin compositions to be discussed below was Epon 828, a commercial liquid aromatic type epoxy resin sold by Shell Chemical Company. Epon 828 has an epoxide equivalent of 175–210 and a viscosity (cps.) at 25° C. between 10,000 and 20,000. The epoxide equivalent is defined as the weight of epoxy resin containing one equivalent weight of epoxide. Epon 828 is characterized as the reaction product of bisphenol A and epichlorohydrin.

The biphenyl anhydride used in all of the adhesive compositions was 3,3',4,4'-benzophenone tetracarboxylic dianhydride (hereinafter BTDA). The BTDA was ground to a fine powder form (will pass through a 325 mesh screen) and was added to the Epon 828 at room temperature. The mixture of Epon 828 and BTDA was then subjected to high shear mixing in a three-roll mill (purchased from Charles Ross and Son Co., Inc. of Brooklyn, N.Y.) for a time sufficient to result in a stable suspension of the BTDA in the Epon 828. By a stable suspension is meant the BTDA did not noticeably settle out on standing for a period in excess of seven days at room temperature. Usually between 2 and 10 runs through the mill are sufficient which takes between 1 and 10 minutes of mixing.

A first series of epoxy resin compositions was prepared using Epon 828 as the epoxy resin and BTDA as the crosslinking agent at varying $A/E$ ratios. The BTDA was added using a three-roll mill as noted above. Fillers consisting of aluminum powder and Cab-O-Sil were next added with mechanical stirring at room temperature. No accelerator was employed. The composition was used to join two 4 x 1 x 0.0625 inch pieces of sandblasted Alclad aluminum in accordance with the test procedure of ASTM D1002 for tensile lap shear strength. The Alclad aluminum pieces were joined together over a one square inch area with the adhesive composition wherein the adhesive composition had a thickness between 1–5 mils. The joined pieces were cured at 200° C. for two hours. The tensile lap shear values at varying temperatures using varying $A/E$ ratios is shown in Table I below. In the data in Table I below and the other data to be presented, the tensile lap shear strength test was run at the actual temperatures stated, i.e. 73° F., 300° F. or 500° F. The specimens were heated to the temperature indicated in an oven and held there for about 10 minutes before the test was performed while the specimens remained in the oven.

TABLE I.—BTDA EPON 828 ADHESIVES, HIGH TEMPERATURE

[Variation of A/E Ratio]

100 phr. atomized aluminum powder
3 phr. Cab-O-Sil [1]
No accelerator
Sandblasted Alclad [2] Al
2 hr. cure at 200° C.

| | | Tensile Lap Shear,[3] p.s.i. at— | | |
|---|---|---|---|---|
| | | Test Temp.,° F. | | |
| | A/E | 73 | 300 | 500 |
| Example No.: | | | | |
| 1 _____ BTDA-Epon 828 ____ | 0.6 | 1,780 | 1,580 | 630 |
| 2 _____ do _____ | 0.7 | 1,750 | 1,480 | 485 |
| 3 _____ do _____ | 0.8 | 1,680 | 1,510 | 825 |
| 4 _____ do _____ | 0.9 | 1,810 | 1,590 | 720 |

[1] Cab-O-Sil is tradename of Cabot corporation for silicon dioxide which is a submicroscopic pyrogenic silica prepared in a hot gaseous environment (1,100° C.) and which has an external surface area of 200 square meters per gram and a particle size of 0.015 micron.
[2] Alclad is a tradename for an aluminum alloy containing 3.8 to 4.9% copper sold by Alcoa as Alclad 2024T3.
[3] ASTM Test No. D1002–53T.

Referring to Table I, it can be seen there is little difference between the values for tensile lap shear at the varying $A/E$ ratios tried. Since the biphenyl anhydride is usually the more expensive component, the lowest $A/E$ ratio consonant with obtaining the desired results is preferred. An $A/E$ ratio of about 0.6 is therefore the preferred ratio.

A second series of epoxy resin compositions having an $A/E$ ratio of 0.6 was prepared using varying amounts and types of fillers. The results of these runs are shown on Table II below.

TABLE II.—USE OF FILLERS TO IMPROVE TENSILE LAP SHEAR STRENGTH IN BTDA-EPON 828 ADHESIVE FORMULATIONS

[Acid Etched Alclad Aluminum [1]]

| | | Fillers, phr. | | Tensile lap shear, p.s.i. |
|---|---|---|---|---|
| | A/E | Aluminum powder | Cab-O-Sil | |
| Example No. | | | | |
| 5 _____ | 0.6 | 0 | 0 | 1,770 |
| 6 _____ | 0.6 | 100 | 0 | 2,080 |
| 7 _____ | 0.6 | 0 | 3 | 1,750 |
| 8 _____ | 0.6 | 100 | 3 | 2,480 |

[1] Aluminum was cleaned with trichloroethylene to degrease and then etched by stirring the aluminum at 150° F. for 5–10 minutes in a solution of 10% sodium dichromate; 20% sulfuric acid (96% H₂SO₄ by weight); and 70% water.

Referring to Table II, Example 5 shows that when no filler is employed, a tensile lap shear strength of 1770 p.s.i. is obtained. Example 6 shows the addition of 100 phr. of powdered aluminum increases the tensile lap shear strength to 2080 p.s.i. while the addition of 3 phr. of Cab-O-Sil has no effect (Example 7). Example 8 shows the more than additive effect of adding both the powdered aluminum (100 phr.) and the thickening agent Cab-O-Sil trolled within several percent of the desired temperature and, after remaining at the desired temperature (500° F.) for a prescribed length of time, the specimens were tested by ASTM test D1002 at 500° F. to determine the tensile lap shear strength. The results of the tests are shown in Table V below.

TABLE V.—PERCENT RETENTION OF TENSILE LAP SHEAR STRENGTH AFTER HEAT AGING AT 482° F. (250° C.) OF BTDA-EPOXY AND EPOXYLITE HIGH TEMPERATURE ADHESIVES ACID ETCHED ALCLAD ALUMINUM SUBSTRATES

| Composition of Example No | Tensile Lap Shear, p.s.i. at 500° F. | | | | | |
|---|---|---|---|---|---|---|
| | 15 BTDA, Epon 828, A/E=0.6 | 10 BTDA, 80% Epon 828, 20% DEN 438, A/E=0.6 | 11 BTDA, 60% Epon 828, 40% DEN 438, A/E=0.6 | 12 Epoxylite Adhesive 5403 | 13 Epoxylite Adhesive 5523 | 14 Epoxylite Adhesive 5524 |
| TLS [1] at 500° F. (5-10 minutes at 500° F.) | 1,220 | 700 | 675 | 770 | 960 | 1,570 |
| TLS [2] after 500 hrs. aging at 500° F | 1,090 | 1,020 | 1,080 | ([3]) | 615 | 575 |
| Percent retention | 90 | 146 | 160 | | 64 | 37 |
| After 1,000 hrs. aging at 500° F | 1,040 | | | | 110 | 150 |
| Percent retention | 85 | | | | 15 | 9.6 |

[1] Tensile lap shear strength actually run at 500° F.
[2] Tensile lap shear actually run at 500° F.
[3] Fell apart.

(3 phr.) in achieving a tensile lap shear strength of 2480 p.s.i.

A third series of epoxy resin compositions having an A/E ratio of 0.6 was prepared using 100 phr. of powdered aluminum and 3 phr. of Cab-O-Sil as the fillers. In this series, a portion of the epoxy resin was supplied by Dow Chemical Company's Novolac resin designated as DEN 438. The results are shown in Table III below.

Referring to Table V, Example 15 shows a 90 percent retention after 500 hours at 500° F. while the Epoxylite 5403 fell apart. After 1000 hours at 500° F., the adhesive of Example 15 which represents the composition of this invention had an 85 percent retention of tensile lap shear strength at 500° F. while the remaining commercial adhesives decreased to 15 and 9.6 percent retention.

TABLE III.—BTDA-EPON 828-DOW DEN 438 NOVOLAC ADHESIVES, HIGH TEMPERATURE

[Variation of Epon 828/Novolac Ratio]

100 phr. aluminum
3 phr. Cab-O-Sil
No accelerator
Sandblasted Alclad Al
2 hr. cure at 200° C.

| Example No. | | A/E | Tensile Lap Shear, p.s.i. at— Test Temp.,° F. | | |
|---|---|---|---|---|---|
| | | | 73 | 300 | 500 |
| 9 | BTDA-Epon 828 | 0.6 | 1,780 | 1,580 | 630 |
| 10 | 80% Epon 828, 20% Dow DEN 438, BTDA | 0.6 | 1,330 | 1,630 | 700 |
| 11 | 60% Epon 828, 40% Dow DEN 438, BTDA | 0.6 | 1,390 | 1,510 | 675 |

Referring to Table III, Example 9 is the same as Example 1. The inclusion of other types of epoxy resins (Examples 10–11) gives about the same results showing that mixtures of epoxy resins can be employed.

The BTDA-Epon 828 adhesive compositions were compared with commercially available Epoxylite high temperature adhesives from the Epoxylite Corporation. The results are shown in Table IV below.

Again referring to Table V, Examples 15, 10 and 11 show that after 500 hours, the tensile lap shear strength values for the Epon 828 and mixed epoxies were about the same (1090, 1020 and 1080 respectively). Note the initial tensile lap shear strength for the Epon 828 alone (Example 15) was 1220 p.s.i. versus only 700 and 675 for the mixed epoxies (Examples 10 and 11). The pre-

TABLE IV.—EVALUATION OF EPOXYLITE [2] HIGH TEMPERATURE ADHESIVES

[Comparison With BTDA Adhesives]

| Example No.: | | Tensile Lap Shear, p.s.i. at— | | |
|---|---|---|---|---|
| | | 73° F. | 300° F.[3] | 500° F.[4] |
| 12 | Epoxylite [2] 5403 | 2,120 | 1,810 | 770 |
| 13 | Epoxylite 5523 | 1,380 | 1,340 | 960 |
| 14 | Epoxylite 5524 | 1,800 | 1,840 | 1,570 |
| 15 | BTDA-Epon 828,[1] A/E=0.6 | 24–2,500 | 16–1,700 | 10–1,200 |

[1] Contains 100 phr. of powdered aluminum and 3 phr. of Cab-O-Sil.
[2] Epoxylite-Tradename of Epoxylite Corporation.
[3] Actually run at 300° F.
[4] Actually run at 500° F.

Referring to Table IV, the Epoxylite adhesives all had poorer strengths at 73° F. but Epoxylite 5524 possessed good high temperature tensile lap shear strength properties.

The compositions of Examples 10–15 above were then subjected to a heat aging test at 250° C. (482° F.) to determine the effect of heat on the tensile lap shear values of these adhesives after extended periods of time. The heat aging test was run by placing the specimens into a high temperature oven wherein the temperature is conferred epoxy resin is therefore the type represented by Epon 828 since high initial tensile lap shear strengths are obtained in addition to good heat aging characteristics. The lower initial values for tensile lap shear strengths in Examples 10 and 11 are believed due to insufficient curing at the time the test was run.

A final series of epoxy resin compositions was prepared using various fillers and tested for their tensile lap shear values at 73° F. The results of this series is shown below in Table VI.

TABLE VI.—EFFECT OF FILLERS ON TENSILE LAP SHEAR STRENGTH OF BTDA ADHESIVES AT 73° F.

BTDA-Epon 828 at A/E=0.6
Cure: 2 hours, 200° C.
Alclad Aluminim Substrate (Acid Etched)

| Example No. | Fillers | Tensile Lap Shear, p.s.i. at 73° F. |
|---|---|---|
| 16 | None | 1,770 |
| 21 | 100 phr. Alumina | 1,500 |
| 17 | 100 phr. Aluminum | 2,080 |
| 22 | 20 phr. Asbestos | 1,450 |
| 20 | 3 phr. Cab-O-Sil | 1,750 |
| 23 | 100 phr. Charcoal | 1,430 |
| 24 | 100 phr. Glass | 1,330 |
| 18 | 100 phr. Iron | 2,550 |
| 25 | 100 phr. Mica | 1,190 |
| 19 | 100 phr. Aluminum, 3 phr. Cab-O-Sil | 2,480 |

Referring to Table VI, only the aluminum and iron (Examples 17, 18 and 19) increased the tensile lap shear strength over the base run (Example 16). Examples 20–25 employed non-metallic fillers and all decreased the tensile lap shear strength of the adhesive.

Resort may be had to such variations and modifications as fall within the spirit of the invention and the scope of the appended claims.

We claim:

1. A new adhesive composition suitable for application at room temperature and which on curing results in a resin having excellent tensile lap shear strength retention properties after heat aging which consists of:
    a suspension of
    a solid biphenyl anhydride selected from the group consisting of:

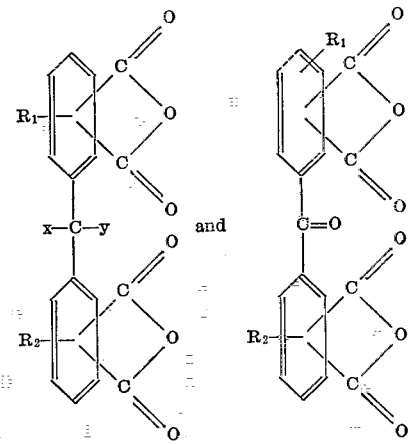

where $x$ and $y$ are monovalent radicals selected from the group consisting of H; an alkyl group having between 1 and 5 carbon atoms; a halogen; OH; OR, where R is an alkyl group having between 1 and 5 carbon atoms; and

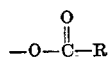

where R is as defined; and where $R_1$ and $R_2$ are monovalent radicals selected from the group consisting of H; an alkyl group having between 1 and 5 carbon atoms; and a halogen;

and a finely divided solid filler comprising a powdered metal in a liquid 1,2-epoxy resin which contains on the average more than one 1,2-epoxy group per molecule;

the amount of said powdered metal being at least 20 parts per 100 parts of resin and the amount of said solid biphenyl anhydride being such that the anhydride to epoxide equivalent ratio is between 0.4 and 1.0

2. A composition according to claim 1 wherein said solid biphenyl anhydride is benzophenone tetracarboxylic acid dianhydride.

3. A composition according to claim 1 wherein the A/E ratio is between 0.55 and 0.9.

4. A composition according to claim 1 wherein said powdered metal is iron.

5. A composition according to claim 1 wherein said powdered metal is aluminum.

6. A composition according to claim 1 wherein said filler comprises a powdered metal in amounts between 20 and 200 phr. and a finely divided non-metallic oxide in amounts between 1 and 50 phr.

7. A composition according to claim 6 wherein the powdered metal is aluminum and the non-metallic oxide is silicon dioxide.

8. A composition according to claim 6 wherein the solid biphenyl anhydride is benzophenone tetracarboxylic acid dianhydride and the epoxy resin has the general formula:

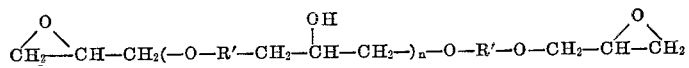

where $R'$ is a divalent aromatic radical and $n$ is an integer between 0 and about 18, and the A/E ratio is between 0.58 and 0.63.

9. A composition according to claim 8 wherein the epoxy resin contains in addition at least a portion of the reaction product of (1) epichlorohydrin with (2) the reaction product of phenol and formaldehyde.

10. A method of producing an adhesive composition suitable for application at room temperature and which on curing results in a resin having excellent tensile lap shear strength retention properties after heat aging which comprises:
    suspending a finely divided solid biphenyl anhydride selected from the group consisting of:

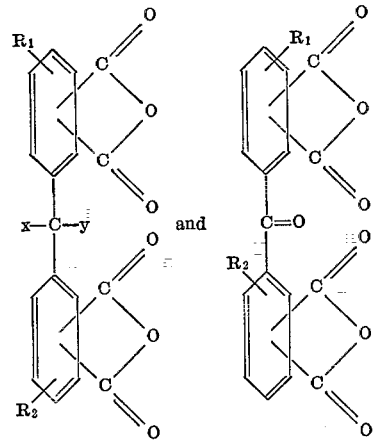

where $x$ and $y$ are monovalent radicals selected from the group consisting of H; an alkyl group having between 1 and 5 carbon atoms; a halogen; OH; OR, where R is an alkyl group having between 1 and 5 carbon atoms; and

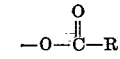

where R is as defined; and where $R_1$ and $R_2$ are monovalent radicals selected from the group consisting of H; an alkyl group having between 1 and 5 carbon atoms; and a halogen;

in a liquid 1,2-epoxy resin which contains on the average more than one 1,2-epoxy groups per molecule, the amount of said solid biphenyl anhydride being such that the A/E equivalent ratio is between 0.4 and 1.0;

said suspension being formed at a temperature between about 20° and about 40° C. by subjecting an admixture of said solid biphenyl anhydride and said liquid epoxy resin to a high shear mixing action sufficient to maintain the solid biphenyl anhydride in suspension at room temperature for a period of at least seven days; and adding to said suspension by stirring a filler comprising a powdered metal in an amount of at least 20 phr.

11. A method according to claim 10 wherein the suspension is formed at substantially room temperature.

12. A method according to claim 11 wherein the suspension is formed using a three-roll mill.

13. A method according to claim 10 wherein said biphenyl anhydride is benzophenone tetracarboxylic dianhydride.

14. A method according to claim 10 wherein the filler comprises a finely powdered metal in an amount between 20 and 200 phr. and a finely divided non-metallic oxide in an amount between 1 and 50 phr.

15. A method according to claim 11 wherein the filler comprises a finely powdered aluminum in an amount between 80 and 120 phr. and a finely divided non-metallic oxide in an amount between 1 and 10 phr.; the solid biphenyl anhydride is benzophenone tetracarboxylic acid dianhydride and the epoxy resin has the general formula:

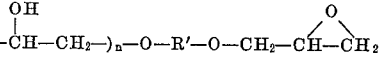

where R' is a divalent aromatic radical and $n$ is an integer between 0 and about 18.

References Cited
UNITED STATES PATENTS

| | | |
|---|---|---|
| 3,183,198 | 5/1965 | Wagner. |
| 3,280,043 | 10/1966 | Larson. |
| 3,324,081 | 6/1967 | Barie et al. |
| 3,337,509 | 8/1967 | Budnowski. |
| 3,284,398 | 11/1966 | Warren et al. _____ 260—37 |
| 3,344,096 | 9/1967 | Manasia et al. _____ 260—37 |

ALLAN LIEBERMAN, Primary Examiner

L. T. JACOBS, Assistant Examiner

U.S. Cl. X.R.
260—2, 47, 59